(12) United States Patent
Kim et al.

(10) Patent No.: US 10,712,610 B2
(45) Date of Patent: Jul. 14, 2020

(54) LIQUID CRYSTAL DISPLAY DEVICE HAVING IMPROVED COOLING EFFICIENCY

(71) Applicant: Samsung Electronics Co., Ltd., Suwon-si, Gyeonggi-do (KR)

(72) Inventors: Sung Ki Kim, Yongin-si (KR); Won-nyun Kim, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/222,273

(22) Filed: Dec. 17, 2018

(65) Prior Publication Data

US 2019/0137819 A1 May 9, 2019

Related U.S. Application Data

(63) Continuation of application No. 14/538,053, filed on Nov. 11, 2014, now Pat. No. 10,191,328, which is a
(Continued)

(30) Foreign Application Priority Data

Jun. 13, 2005 (KR) ........................ 10-2005-0050440

(51) Int. Cl.
*G02F 1/13357* (2006.01)
*F21V 8/00* (2006.01)
*G02F 1/1333* (2006.01)

(52) U.S. Cl.
CPC ..... *G02F 1/133603* (2013.01); *G02B 6/0055* (2013.01); *G02B 6/0085* (2013.01);
(Continued)

(58) Field of Classification Search
CPC combination set(s) only.
See application file for complete search history.

(56) References Cited

U.S. PATENT DOCUMENTS 3,981,427 A 9/1976 Brookes
6,068,932 A 5/2000 Sakamoto
(Continued)

FOREIGN PATENT DOCUMENTS

CN 2336378 9/1999
CN 2630891 8/2004
(Continued)

OTHER PUBLICATIONS

U.S. Office Action dated Sep. 9, 2014 issued in U.S. Appl. No. 14/253,456.
(Continued)

*Primary Examiner* — Lauren Nguyen
(74) *Attorney, Agent, or Firm* — Staas & Halsey LLP

(57) ABSTRACT

A liquid crystal display device includes a liquid crystal display panel, a light guide plate disposed on a lower part of the liquid crystal display panel, an LED circuit substrate disposed along at least one side of the light guide plate to accommodate an LED on a front surface thereof, and a heat transmission member having a first part that faces a lower surface of the light guide plate and a second part that is extendedly bent from the first part and faces the LED circuit substrate.

38 Claims, 5 Drawing Sheets

Related U.S. Application Data continuation of application No. 14/253,456, filed on Apr. 15, 2014, now Pat. No. 10,162,217, which is a continuation of application No. 11/450,373, filed on Jun. 12, 2006, now Pat. No. 8,736,788.

(52) U.S. Cl.
CPC ...... *G02F 1/133382* (2013.01); *G02B 6/0051* (2013.01); *G02B 6/0053* (2013.01); *G02F 2001/133628* (2013.01)

(56) References Cited

U.S. PATENT DOCUMENTS

| | | | |
|---|---|---|---|
| 6,697,130 | B2 | 2/2004 | Weindorf |
| 6,930,737 | B2 | 8/2005 | Weindorf |
| 7,193,248 | B2 | 3/2007 | Weindorf |
| 7,220,040 | B2 | 5/2007 | Lengyel |
| 7,488,104 | B2 | 2/2009 | Hamada et al. |
| 7,513,661 | B2 | 4/2009 | Hamada et al. |
| 7,626,672 | B2 | 12/2009 | Song |
| 2003/0007109 | A1 | 9/2003 | Park |
| 2004/0004424 | A1* | 1/2004 | Sakurai ............... G02B 6/0085 313/110 |
| 2005/0073638 | A1 | 4/2005 | Byun et al. |
| 2005/0141244 | A1 | 6/2005 | Hamada et al. |
| 2005/0157500 | A1 | 7/2005 | Chen |
| 2005/0179850 | A1 | 8/2005 | Du |
| 2006/0139951 | A1 | 6/2006 | Lee |
| 2006/0292461 | A1 | 12/2006 | Shives et al. |
| 2007/0114010 | A1 | 5/2007 | Upadhya et al. |
| 2008/0024694 | A1 | 1/2008 | Kondo |

FOREIGN PATENT DOCUMENTS

| | | |
|---|---|---|
| CN | 1580896 | 2/2005 |
| CN | 1603890 | 4/2005 |
| CN | 1608184 | 4/2005 |
| JP | 2002-229022 | 8/2002 |
| JP | 2003-279980 | 10/2003 |
| KR | 2003-79777 | 10/2003 |
| KR | 20-0347118 | 4/2004 |
| KR | 10-2005-0013768 | 2/2005 |

OTHER PUBLICATIONS

Korean Office Action dated Oct. 4, 2006 issued in KR 2005-50440.
Chinese Office Action dated Jan. 4, 2008 issued in CN 2006-100912864.
Restriction Requirement dated Aug. 13, 2009 issued in U.S. Appl. No. 11/450,373.
Office Action dated Apr. 1, 2010 issued in U.S. Appl. No. 11/450,373.
Final Office Action dated Nov. 10, 2010 issued in U.S. Appl. No. 11/450,373.
Office Action dated Mar. 7, 2012 issued in U.S. Appl. No. 11/450,373.
Final Office Action dated Aug. 8, 2012 issued in U.S. Appl. No. 11/450,373.
Final Office Action dated Nov. 20, 2012 issued in U.S. Appl. No. 11/450,373.
Office Action dated Aug. 21, 2013 issued in U.S. Appl. No. 11/450,373.
Notice of Allowance dated Jan. 15, 2014 issued in U.S. Appl. No. 11/450,373.
Notice of Allowability dated Apr. 11, 2014 issued in U.S. Appl. No. 11/450,373.
Corrected Notice of Allowability dated May 5, 2014 issued in U.S. Appl. No. 11/450,373.
U.S. Notice of Allowance dated Aug. 15, 2018 in U.S. Appl. No. 14/253,456 and Supplemental Notice of Allowance dated Nov. 21, 2018 in U.S. Appl. No. 14/253,456.
U.S. Advisory Action dated Sep. 12, 2017 in related U.S. Appl. No. 14/253,456 and U.S. Office Action dated Mar. 5, 2018 in U.S. Appl. No. 14/253,456.
Final Office Action dated Jun. 29, 2017 in co-pending U.S. Appl. No. 14/253,456.
U.S. Office Action dated Mar. 3, 2017 in U.S. Appl. No. 14/253,456.
U.S. Final Office Action dated Nov. 9, 2016 in co-pending U.S. Appl. No. 14/253,456.
U.S. Restriction Requirement dated Jun. 27, 2014 in related U.S. Appl. No. 14/253,456.
U.S. Advisory Action dated Jan. 19, 2017 in related U.S. Appl. No. 14/253,456 and U.S. Office Action dated Apr. 17, 2015 in related U.S. Appl. No. 14/253,456.
U.S. Office Action dated Jul. 22, 2015 in related U.S. Appl. No. 14/253,456.
U.S. Office Action dated Apr. 6, 2016 in U.S. Appl. No. 14/538,053.
U.S. Office Action dated Jul. 22, 2016 in U.S. Appl. No. 14/538,053.
U.S. Advisory Action dated Jan. 20, 2017 in U.S. Appl. No. 14/538,053 and U.S. Office Action dated Nov. 8, 2016 in U.S. Appl. No. 14/538,053.
U.S. Office Action dated Mar. 2, 2017 in U.S. Appl. No. 14/538,053.
U.S. Advisory Action dated Aug. 29, 2017 in U.S. Appl. No. 14/538,053 and U.S. Office Action dated Jun. 12, 2017 in U.S. Appl. No. 14/538,053.
U.S. Office Action dated Sep. 29, 2017 in U.S. Appl. No. 14/538,053.
U.S. Office Action dated Mar. 9, 2018 in U.S. Appl. No. 14/538,053 and U.S. Advisory Action dated Jun. 8, 2018 in U.S. Appl. No. 14/538,053.
U.S. Notice of Allowance dated Sep. 17, 2018 in U.S. Appl. No. 14/538,053 and U.S. Supplemental Notice of Allowance dated Dec. 3, 2018 in U.S. Appl. No. 14/538,053.

\* cited by examiner

LIQUID CRYSTAL DISPLAY DEVICE HAVING IMPROVED COOLING EFFICIENCY

CROSS-REFERENCE TO RELATED APPLICATIONS

This is a continuation of prior application Ser. No. 14/538,053 filed Nov. 11, 2014, which is a continuation of prior application Ser. No. 14/253,456 filed Apr. 15, 2014, which is a continuation of prior application Ser. No. 11/450,373, filed on Jun. 12, 2006 in the U.S. Patent and Trademark Office, which claims priority under 35 U.S.C. § 119(a) from Korean Patent Application No. 10-2005-0050440, filed on Jun. 13, 2005, in the Korean Intellectual Property Office, the disclosures of which are incorporated herein by reference in their entirety.

BACKGROUND OF THE INVENTION

1. Field of the Invention

The present general inventive concept relates to a liquid crystal display, and more particularly, to a liquid crystal display having a light emitting diode (LED) as a light source.

2. Description of the Related Art

Recently, flat panel displays, such as a liquid crystal display (LCD), a plasma display panel (PDP), or an organic light emitting diode (OLED), have been widely developed to replace a conventional cathode ray tube (CRT).

The LCD comprises a liquid crystal display panel, which has a thin film transistor substrate, a color filter substrate, and liquid crystal interposed between the thin film transistor substrate and the color filter substrate. Since the LCD is a non-light emitting apparatus, the LCD needs a backlight unit, which is disposed on a rear surface of the thin film transistor substrate, to supply light to the liquid crystal display panel. The amount of transmission of the light emitted from the backlight unit is controlled according to an array state of the liquid crystal. The LCD panel and the backlight unit are accommodated in a chassis.

The backlight unit can be classified as one of an edge type backlight and a direct type backlight according to a position of a light source. The edge type backlight has a structure in which the light source is disposed on a lateral part of a light guide plate. The edge type backlight is applied to a relatively small liquid crystal display, which is generally used in laptop and desktop computers. The edge type backlight is advantageous for having high uniformity of luminance, long lifetime, and thin thickness.

A light emitting diode (LED) has been widely used as the light source of the backlight unit due to its high brightness and excellent color realization. However, the LED generates much heat compared to other light sources, such as a cold cathode fluorescent lamp (CCFL) or an external electrode fluorescent lamp (EEFL). The heat from the LED may lower brightness and cause color shifts if it is not properly discharged.

Conventional backlight units use a radiating fin, a heat pipe, and a cooling fan to remove heat generated by the LED, thereby making the LCD heavier and thicker.

SUMMARY OF THE INVENTION

The present general inventive concept provides a liquid crystal display (LCD) that has a thin thickness and an excellent LED cooling efficiency.

Additional aspects and/or advantages of the present general inventive concept will be set forth in part in the description which follows and, in part, will be obvious from the description, or may be learned by practice of the present general inventive concept.

The foregoing and/or other aspects and utilities of the present general inventive concept can be achieved by providing a liquid crystal display device, comprising a liquid crystal display panel, a light guide plate disposed on a lower part of the liquid crystal display panel, an LED circuit substrate disposed along at least one side of the light guide plate to accommodate an LED on a front surface of the LED circuit substrate, and a heat transmission member having a first part that faces a lower surface of the light guide plate and a second part which extendedly bends from the first part and faces the LED circuit substrate.

The heat transmission member can comprise a first sub-layer formed across the first part and the second part of the heat transmission member, and a second sub-layer provided on at least a part of an external surface of the first sub-layer.

The first sub-layer can be made of aluminum.

A heat transmission of the second sub-layer can be larger than a heat transmission of the first sub-layer.

The second sub-layer can be made of graphite.

At least a part of the second sub-layer can be provided in the second part of the heat transmission member.

The heat transmission of the second sub-layer can be greater than or equal to about 400 W/m$^2$.

The LED circuit substrate can be made of metal.

The liquid crystal display can further comprise a gap pad disposed between the LED circuit substrate and the heat transmission member.

The liquid crystal display can further comprise a reflection plate disposed at a rear side of the light guide plate, the reflection plate comprising a first surface disposed on a lower part of the light guide plate, a second surface extendedly bent from the first surface and disposed between the light guide plate and the LED, and comprising an LED accommodating hole to accommodate the LED, and a third surface extended from the second surface parallel to the liquid crystal display panel to cover a part of the light guide plate.

The liquid crystal display can further comprise a reflection cover to reflect light from the LED toward the light guide plate and to accommodate the LED circuit substrate.

The liquid crystal display can further comprise a first gap pad disposed between the LED circuit substrate and the reflection cover, and a second gap pad disposed between the reflection cover and the heat transmission member.

The foregoing and/or other aspects and utilities of the present general inventive concept can also be achieved by providing a liquid crystal display unit, comprising a liquid crystal display panel, a first plate located on a bottom surface of the liquid crystal display panel to guide light to the liquid crystal display panel, a second plate located on a bottom surface of the first plate to reflect light to the first plate, a light source substrate having at least one light source to provide the light to the liquid crystal display panel through the first plate, and a first member located on a bottom surface of the second plate and contacting the light source substrate to transfer heat away from the at least one light source.

The second plate can comprise a first surface parallel to the bottom surface of the first plate, a second surface perpendicular to the first surface, and a third surface parallel to the first surface and separated from the first surface by the second surface. The light source substrate can be located on the second surface of the second plate. The third surface of the second plate can prevent light from the at least one light source from reaching the liquid crystal display panel without passing through the first plate. The second surface of the second plate can include at least one hole to accommodate the at least one light source of the light source substrate. The first member can comprise a first surface parallel to the bottom surface of the first plate, and a second surface perpendicular to the first surface and contacting the light source substrate. The first member can further comprise at least one additional surface perpendicular to the first surface. The liquid crystal display unit can further comprise a second member located on a surface of the first member and contacting the first member to transfer heat away from the at least one light source and the first member. The second member can comprise at least one of a first surface parallel to the bottom surface of the first plate, and a second surface perpendicular to the first surface and contacting the second surface of the first member.

The liquid crystal display panel can comprise a thin film transistor substrate, a color filter substrate, a sealant connecting the thin film transistor substrate and the color filter substrate, a closed space having a boundary defined by the thin film transistor substrate, the color filter substrate, and the sealant, and a liquid crystal layer located in the closed space. The first member can indirectly contact the light source substrate. The first member can indirectly contact the light source substrate through a plurality of intervening parts. The plurality of intervening parts can comprise a reflection part to reflect the light from the at least one light source to the first plate, and a heat transfer part to transfer the heat from the at least one light source to the first member.

The light source substrate can contact the first plate. The at least one light source can be located on a first surface of the light source substrate, and the first member can contact a second surface of the light source substrate. A heat transmission of the second member can be greater than a heat transmission of the first member. The heat transmission of the first member can be in a range of about 150 W/m$^2$ to about 400 W/m$^2$, and the heat transmission of the second member can be greater than or equal to about 400 W/m$^2$.

The foregoing and/or other aspects and utilities of the present general inventive concept can also be achieved by providing a display device, comprising a panel, a guide unit disposed at a rear side of the panel to guide light to the panel, a light source disposed on an outer portion of the guide unit to emit the light to the guide unit, and a heat transfer member to create a heat transfer path to transfer heat from the light source to outside of the display device at a rear side thereof.

The heat transfer member can operate without a cooling fan. The heat transfer member can have a surface area that is greater than or equal to a surface area of the panel. The heat transfer member can be parallel to the panel and can be exposed at a rear portion of the display device. The light source can be disposed at an edge of the guide unit. The heat member can form the heat transfer path to transfer heat in a first direction from the light source to a side portion of the display device and in a second directed from the side portion of the display device toward a rear portion of the device.

The foregoing and/or other aspects and utilities of the present general inventive concept can also be achieved by providing a display panel casing, comprising a cover, a guide unit disposed at a rear portion of the cover, a light source disposed at an edge portion of the guide unit, and a heat transmission member comprising a rear panel of the casing and forming a path to transfer heat from the light source to the rear panel. The heat transfer member can comprise a first portion that is the rear panel of the casing, and a second portion extending perpendicular to the first portion and extending between the cover and the guide unit to closely contact the light source.

The foregoing and/or other aspects and utilities of the present general inventive concept can also be achieved by providing a method of cooling a liquid crystal display apparatus, comprising transferring heat generated by a light source to a heat transfer member having a heat transmission of greater than or equal to 150 W/m$^2$, and transferring the heat from the heat transfer member to outside of the liquid crystal display apparatus. The method can further comprise transferring the heat from the heat transfer member to a secondary heat transfer member, and transferring the heat from the secondary heat transfer member to outside of the liquid crystal display apparatus.

BRIEF DESCRIPTION OF THE DRAWINGS

The above and/or other aspects and advantages of the present general inventive concept will become apparent and more readily appreciated from the following description of the embodiments, taken in conjunction with the accompany drawings of which.

DETAILED DESCRIPTION OF THE PREFERRED EMBODIMENTS

Figure 1:
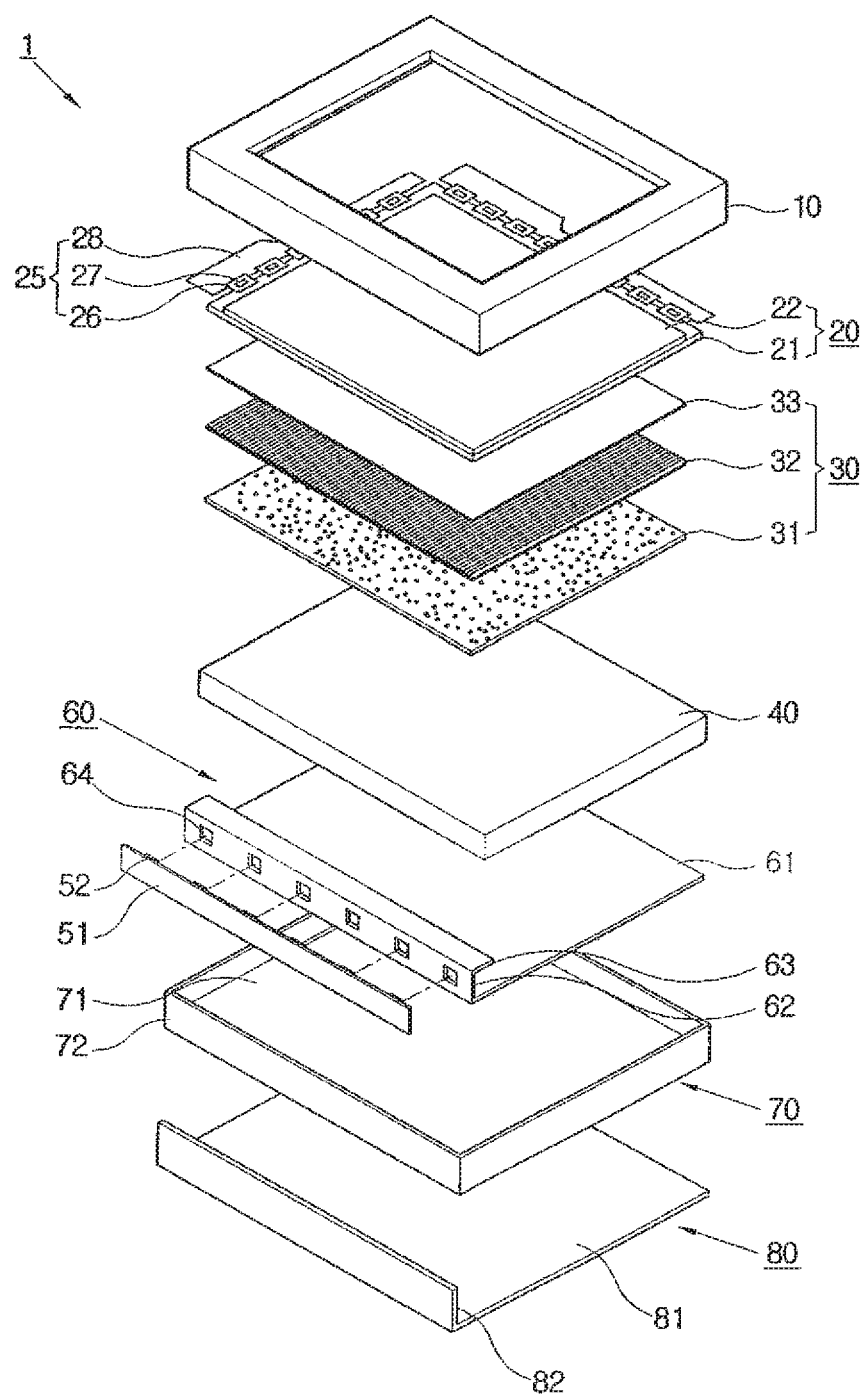
FIG. 1 is an exploded perspective view illustrating a liquid crystal display (LCD) device according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

A liquid crystal display (LCD) device according to an embodiment of the present general inventive concept will be described with reference to FIGS. 1 and 2.

FIG. 1 is an exploded perspective view illustrating the LCD device according to this embodiment of the present general inventive concept. FIG. 2 is a sectional view illustrating the LCD according to this embodiment of the present general inventive concept.

A liquid crystal display (LCD) device 1 comprises a liquid crystal display panel 20, a light control member 30 disposed on a rear surface of the liquid crystal display panel 20, a light guide plate 40 disposed on a rear surface of the light control member 30, a light emitting diode (LED) circuit substrate 51 disposed on an incident surface of the light guide plate 40 to accommodate an LED 52, a reflection plate 60 disposed across a reflection surface, the incident surface, and an emitting surface of the light guide plate 40, a heat transmission member 70, and an auxiliary heat transmission member 80. The liquid crystal display panel 20, the light control member 30, and the light guide plate 40 are accommodated between a cover 10 and the heat transmission member 70.

Figure 2:
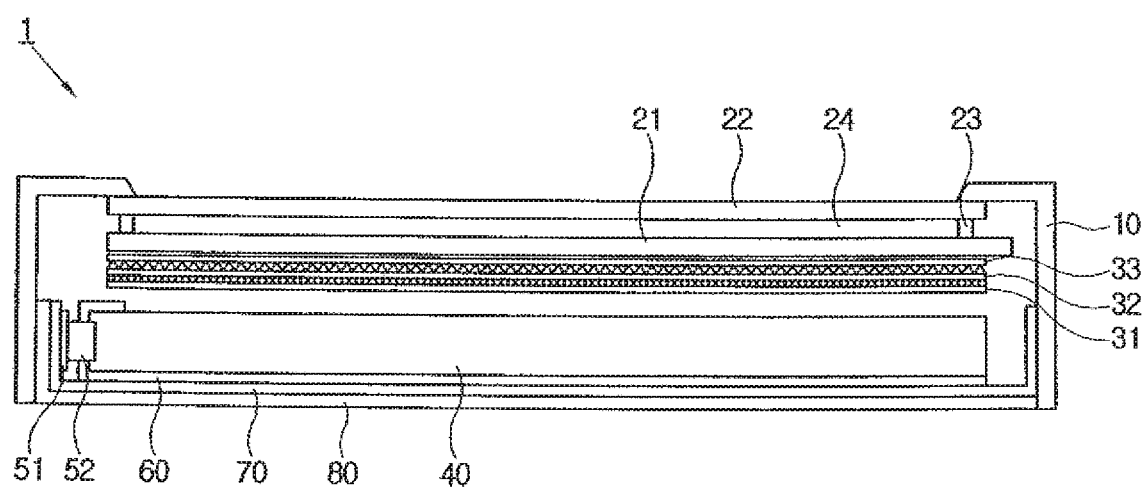
FIG. 2 illustrates a sectional view of the LCD device of FIG. 1.

Referring to FIGS. 1 and 2, the liquid crystal display panel 20 may comprise a thin film transistor substrate 21 that forms a thin film transistor on the liquid crystal display panel 20, a color filter substrate 22 to face the thin film transistor substrate 21, a sealant 23 to bond the thin film transistor substrate 21 and the color filter substrate 22 and to form a cell gap, and a liquid crystal layer 24 disposed between the thin film transistor substrate 21, the color filter substrate 22, and the sealant 23 in the cell gap. The liquid crystal display panel 20 displays a picture by controlling an alignment of liquid crystal molecules of the liquid crystal layer 24. As the liquid crystal display panel 20 is a non-light emitting element, the liquid crystal layer 24 receives light from the LED 52 of the LED circuit substrate 51. A driver 25 can be disposed on a first side of the thin film transistor substrate 21 to apply a driving signal. The driver 25 can comprise a flexible printed circuit (FPC) substrate 26, a driving chip 27 mounted in the FPC substrate 26, and a printed circuit board (PCB) 28 connected to a side of the FPC substrate 26. The driver 25 illustrated in FIG. 1 is an example of a chip on film (COF) method to configure the driver 25. However, other known methods include a tape carrier package (TCP), a chip on glass (COG), and the like to configure the driver 25. Alternatively, the driver 25 may be mounted in the thin film transistor substrate 21 to form a wire.

The light control member 30 disposed on the rear surface of the liquid crystal display panel 20 may comprise a diffusion film 31, a prism film 32, and a protection film 33.

The diffusion film 31 may comprise a base board and a coating layer having bead shaped members formed on the base board. The heat from the LED 52 is converted into plane light by the light guide plate 40 and is diffused by the diffusion film 31 to be uniformly supplied to the entire liquid crystal display panel 20.

The prism film 32 is formed with prisms, each of which are shaped like a triangular pillar and are disposed on an upper surface of the prism film 32 at a predetermined interval. The prism film 32 concentrates light diffused by the diffusion film 31 in a vertical direction toward the liquid crystal display panel 20. The prism film 32 may comprise two sheets, and forms a predetermined angle with a micro prism formed in the prism film 32. A majority of light passing through the prism film 32 passes vertically to produce a uniform brightness distribution. A reflection polarizing film (not illustrated) may be used together with the prism film 32 as necessary or as desired. Alternatively, only the reflection polarizing film may be used, without the prism film 32.

The protection film 33 is disposed on a top portion of the light control member 30. The protection film 33 protects the prism film 32 from scratching.

The light guide plate 40 disposed on the rear surface of the light control member 30 changes a path of light incident from the LED 52 disposed on a lateral part of the light guide plate 40 to supply plane light to the light control member 30. The light guide plate 40 comprises the incident surface to receive the light from the LED 52, the emitting surface to emit the light to the light control member 30, and the reflection surface to face the incident surface and to reflect some light that is not initially directed toward the light control member 30. The reflection surface may form a prism pattern (not illustrated), a V-cut pattern (not illustrated), and a diffusion pattern (not illustrated). The light guide plate 40 can be made of, for example, a transparent acryl material. The light guide plate 40 illustrated in FIGS. 1 and 2 is a plate type light guide plate. Alternatively, a wedge type light guide plate may be used.

The LED circuit substrate 51 is disposed along a first side (i.e., the lateral part) of the light guide plate 40.

The LED 52 is mounted in the LED circuit substrate 51 to face the light guide plate 40. Each LED 52 of an array of LEDs mounted on the LED circuit substrate 51 may emit a red light, a blue light, or a green light to supply a white light to the liquid crystal display panel 20. The LED 52 and the light guide plate 40 are spaced at a predetermined interval to mix the respective lights. The heat generated by the LED 52 is directly supplied to the LED circuit substrate 51. The LED circuit substrate 51 may be made of metal, such as aluminum having excellent heat transmission efficiency, to efficiently discharge heat to outside of the LCD device 1.

The reflection plate 60 comprises a first surface 61 disposed on a lower part of the light guide plate 40, a second surface 62 which extendedly bends from the first surface 61 to be disposed between the light guide plate 40 and the LED 52 and to form an LED accommodating hole 64 on the second surface 62 to accommodate the LED 52, and a third surface 63 which extends to be parallel to the liquid crystal display panel 20 from the second surface 62 and to cover a part of the light guide plate 40.

The first surface 61 sends light incident below from the reflection surface of the light guide plate 40 back to the light guide plate 40 to improve light efficiency. The second surface 62 prevents light from the LED 52 from being incident on the LED circuit substrate 51 through the LED accommodating hole 64. A size of the LED accommodating hole 64 can be similar to a size of the LED 52. The third surface 63 prevents light from the LED 52 from being directly incident on the light control member 30 without passing through the light guide plate 40. If light from the LED 52 does not pass through the light guide plate 40, a bright line may occur along a side part of a screen (not illustrated).

The reflection plate 60 may be made of, for example, polyethyleneterephthalate (PET) or polycabonate (PC).

The heat transmission member 70 accommodates the light guide plate 40, the LED 52, and the reflection plate 60. The heat transmission member 70 comprises a lower surface 71 disposed on a rear surface of the light guide plate 40, and a side surface 72 upwardly bent from the lower surface 71.

The heat transmission member 70 transmits heat generated by the LED 52 to outside of the LCD device 1. Thus, a part of the side surface 72 is in close contact with, or is closely adhered to, a rear surface of the LED circuit substrate 51. The heat transmission of the heat transmission member 70 can be about 150 W/m$^2$ or greater. For example, the heat transmission of the heat transmission member 70 can be in a range of about 150 W/m$^2$ to about 400 W/m$^2$, such as about 150 W/m$^2$ to about 300 W/m$^2$. The heat transmission member 70 may be made of, for example, aluminum.

The auxiliary heat transmission member 80 is attached to an external surface of the heat transmission member 70. The auxiliary heat transmission member 80 comprises a lower surface 81 disposed on the rear surface of the light guide plate 40 and a side surface 82 upwardly bent from the lower surface 81. The heat transmission of the auxiliary heat transmission member 80 can be larger than that of the heat transmission member 70. For example, the heat transmission of the auxiliary heat transmission member 80 can be about 400 W/m$^2$ or greater. Furthermore, the heat transmission of the auxiliary heat transmission member 80 may be in a range of about 400 W/m$^2$ to about 1,000 W/m$^2$. The auxiliary heat transmission member 80 may be made of, for example, graphite, and the like. Although the auxiliary heat transmission member 80 is disposed on both the lower surface 71 and the side surface 72 of the heat transmission member 70 in this embodiment of the present general inventive concept, the present general inventive concept is not so limited. Accordingly, in various embodiments of the present general inventive concept, the auxiliary heat transmission member 80 may comprise either the lower surface 81 or the side surface 82, as opposed to both of the lower surface 81 or the side surface 82.

The liquid crystal display 1 according to this embodiment of the present general inventive concept is smaller in size and better in LED cooling efficiency compared to a conventional liquid crystal display employing, for example, a radiating fin and/or a cooling fan. In fact, the liquid crystal display device 1 does not need a radiating fin or a cooling fan in order to cool efficiently.

Figure 3:
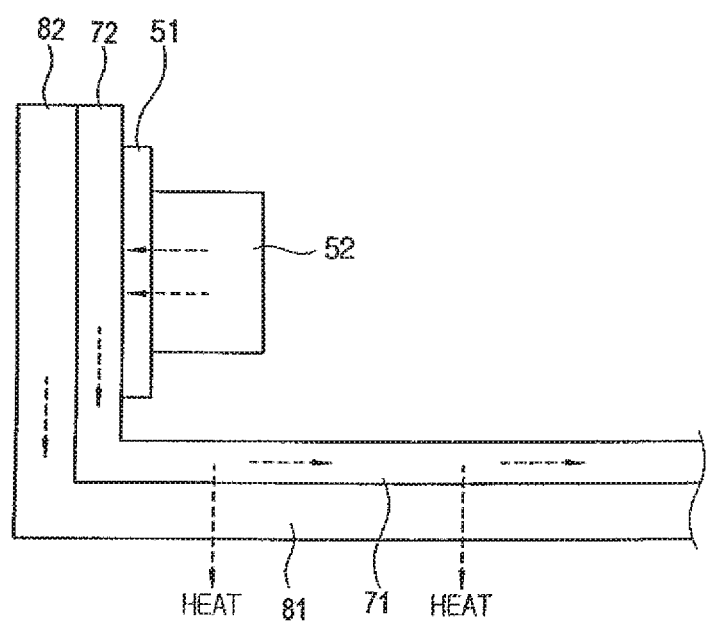
FIG. 3 illustrates a cooling flow of the LCD device of FIG. 1.

Hereinafter, the liquid crystal display device 1 according to the above-described embodiment of the present general inventive concept will be described in detail with reference to FIG. 3.

The LED 52 generates a large amount of heat while being driven. The heat from the LED 52 is transmitted to the LED circuit substrate 51. Since the LED circuit substrate 51 and the heat transmission member 70 are in close contact with, or are closely adhered to, each other, the heat moves to the heat transmission member 70. The heat transmitted to the heat transmission member 70 having high heat transmission passes through the side surface 72 of the heat transmission member 70 and the lower surface 71 efficiently.

As the heat transmission member 70 contacts (e.g., is adhered to) the auxiliary heat transmission member 80, the heat from the heat transmission member 70 moves to the auxiliary heat transmission member 80. The heat is efficiently transmitted to the lower surface 81 of the auxiliary heat transmission member 80 through the heat transmission member 70 as the heat transmission of the auxiliary heat transmission member 80 is larger than that of the heat transmission member 70. Furthermore, the heat is transmitted to the lower surface 81 of the auxiliary heat transmission member 80 to be quickly discharged to the outside, since a surface area of the lower surface 81 in contact with external air is large.

Each LED 52 is a point light source, thereby forming a plurality of hot spots in the LED circuit substrate 51. However, the heat is distributed across the auxiliary heat transmission member 80 by passing through the heat transmission member 70 and the auxiliary heat transmission member 80. Since the auxiliary heat transmission member 80 has a larger surface area in contact with external air, the liquid crystal display device 1 has a high LED cooling efficiency.

As described above, the LED 52 is efficiently cooled by the heat transmission member 70 and the auxiliary heat transmission member 80 in this embodiment of the present general inventive concept, without using conventional cooling devices, such as the radiating fin or the cooling fan. Accordingly, the liquid crystal display device 1 may be lighter, thinner and calmer as compared to a conventional LCD.

Hereinafter, a liquid crystal display according to another embodiment of the present general inventive concept will be described with reference to FIG. 4.

Figure 4:
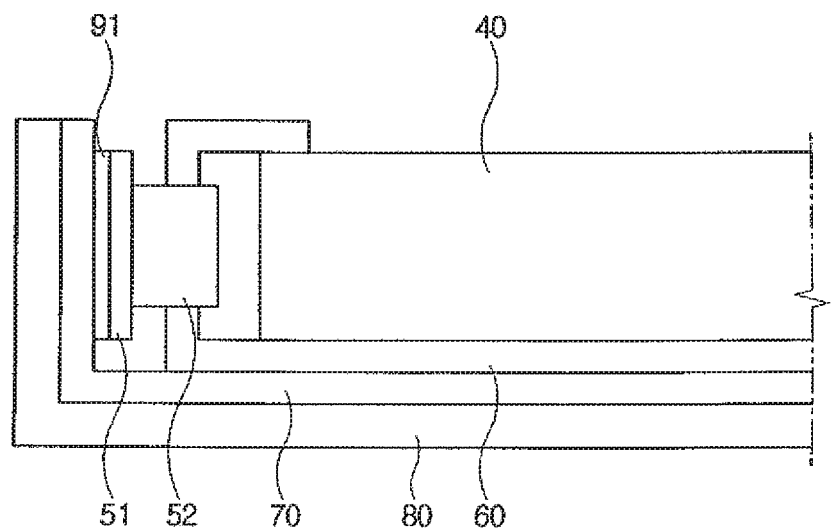
FIG. 4 is a sectional view illustrating main parts of a liquid crystal display (LCD) device according to another embodiment of the present general inventive concept.

As illustrated in FIG. 4, a liquid crystal display according to this embodiment of the present general inventive concept comprises a gap pad 91 disposed as an intervening part between an LED circuit substrate 51 and a heat transmission member 70. The gap pad 91 is a thin plate made of material having a high heat transfer coefficient, and can have a thickness of, for example, approximately 0.5 mm.

The LED circuit substrate 51 and the heat transmission member 70 may be made of metal having high heat transmission efficiency. Even though the LED circuit substrate 51 and the heat transmission member 70 are in close contact with, or are closely adhered to, each other, a hollow area is generated between the LED circuit substrate 51 and the heat transmission member 70 that lowers heat transmission efficiency. The gap pad 91 is in close contact with, or is closely adhered to, both the LED circuit substrate 51 and the heat transmission member 70, which are made of metal, to improve heat radiation efficiency. Heat from an LED 52 sequentially passes through the LED circuit substrate 51, the gap pad 91, and the heat transmission member 70 to be transmitted to an auxiliary heat transmission member 80.

Hereinafter, a liquid crystal display according to still another embodiment of the present general inventive concept will be described with reference to FIG. 5.

Figure 5:
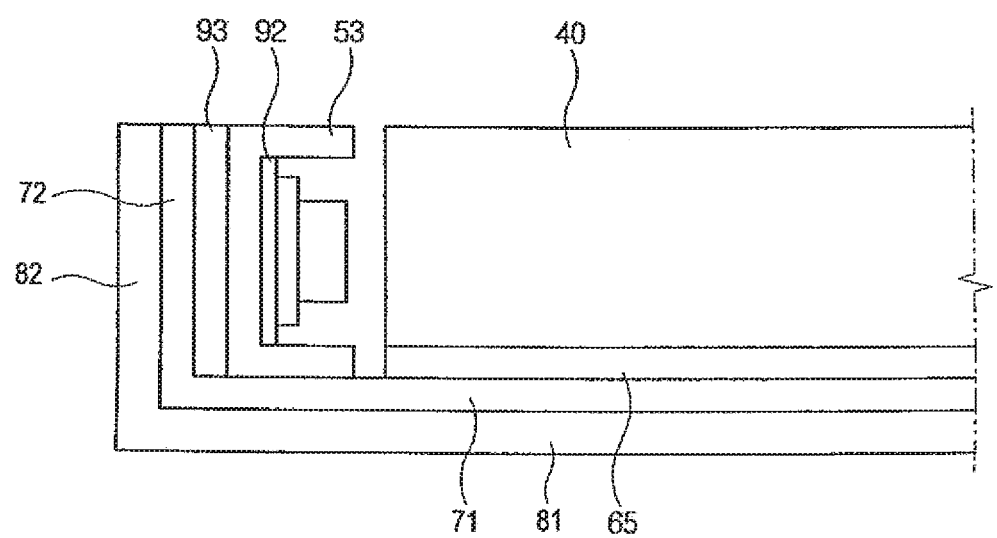
FIG. 5 is a sectional view illustrating main parts of a liquid crystal display (LCD) device according to still another embodiment of the present general inventive concept.

As illustrated in FIG. 5, a liquid crystal display according to this embodiment of the present general inventive concept comprises a simplified reflection plate 65. The liquid crystal display according to this embodiment further comprises a reflection cover 53 to cover an LED circuit substrate 51. Unlike in FIGS. 1-3, the reflection plate 65 according to this embodiment is disposed on a lower part of a light guide plate 40 alone (e.g., without being connected to the LED circuit substrate 51 or an LED 52). The reflection cover 53 reflects light from the LED 52 toward the light guide plate 40. The reflection cover 53 may be made of highly reflection-efficient metal. Gap pads 92 and 93 are disposed between the reflection cover 53 and the LED circuit substrate 51, and disposed between the reflection cover 53 and a heat transmission member 70, respectively. Heat from the LED 52 sequentially passes through the LED circuit substrate 51, the gap pad 92, the reflection cover 53, the gap pad 93, and the heat transmission member 70 to be transmitted to an auxiliary heat transmission member 80. The gap pads 92 and 93 and the reflection cover 53 are intervening parts disposed between the LED circuit substrate 51 and the heat transmission member 70.

Although the embodiments described above illustrate the heat transmission member 70 and the auxiliary heat transmission member 80 in the absence of conventional cooling devices, the present general inventive concept is not so limited. Accordingly, in various embodiments of the present general inventive concept, a heat transmission member and an auxiliary heat transmission member may be used together with one or more conventional cooling devices, such as a radiating fin, a heat pipe, a cooling fan, and an aluminum radiating plate, to improve LED cooling efficiency. Furthermore, although FIGS. 1-5 illustrate two distinct heat transmission members (i.e., the heat transmission member 70 and the auxiliary heat transmission member 80), the liquid crystal display device according to various embodiments of the present general inventive concept may include a single heat transmission member that includes a plurality of sub-layers. For example, the liquid crystal display device may include a single heat transmission member containing a first sub-layer (e.g., corresponding to the heat transmission member 70), and a second sub-layer (e.g., corresponding to the auxiliary heat transmission member 80).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A backlight unit, comprising:
   a light guide element arranged parallel with a liquid crystal display panel;
   a circuit substrate including a metallic substrate and arranged with the light guide element, a front surface of the circuit substrate facing a lateral side of the light guide element;
   light emitting diodes (LEDs) arranged on the front surface of the circuit substrate to emit light toward the lateral side of the light guide element;
   a first heat transmission member having a first portion arranged along the light guide element, an inner surface of the first portion of the first heat transmission member facing a bottom surface of the light guide element, and a second portion extending from an end of the first portion of the first heat transmission member to be arranged along the circuit substrate, an inner surface of the second portion of the first heat transmission member facing a rear surface of the metallic substrate of the circuit substrate;
   a second heat transmission member having a first portion arranged along the first portion of the first heat transmission member, an outer surface of the first portion of the second heat transmission member contacting the inner surface of the first portion of the first heat transmission member, and a second portion arranged along the second portion of the first heat transmission member, an outer surface of the second portion of the second heat transmission member contacting the inner surface of the second portion of the first heat transmission member;
   an intervening element disposed between the circuit substrate and the second portion of the second heat transmission member, an inner surface of the intervening element contacting the rear surface of the metallic substrate of the circuit substrate and an outer surface of the intervening element contacting an inner surface of the second portion of the second heat transmission member; and
   a reflection element disposed between the light guide element and the first portion of the second heat transmission member, an upper surface of the reflection element contacting the bottom surface of the light guide element and a bottom surface of the reflection element contacting an inner surface of the first portion of the second heat transmission member to reflect the light toward the liquid crystal display panel through the light guide element,
   wherein the LEDs are arranged to be spaced apart from the lateral side of the light guide element.

2. The backlight unit of claim 1, wherein the first second heat transmission member is in thermal contact with the LEDs and the circuit substrate to receive heat from the LEDs through the circuit substrate and transmit the received heat to the first heat transmission member.

3. The backlight unit of claim 1, wherein the intervening element includes a gap pad which has a thin plate shape.

4. The backlight unit of claim 1, wherein the inner surface and the outer surface of the intervening element adhere the rear surface of the metallic substrate of the circuit substrate and the inner surface of the second portion of the second heat transmission member, respectively, and wherein the intervening element is in thermal contact with the circuit substrate and the second heat transmission member.

5. The backlight unit of claim 1, wherein a size of the upper surface of the reflection element is larger than a size of the bottom surface of the light guide element.

6. The backlight unit of claim 1, wherein the first heat transmission member and the second heat transmission member are made of graphite and metal, respectively.

7. A display device, comprising:
   a liquid crystal display panel; and
   a back light unit,
   wherein the back light unit comprises:
      a light guide element arranged parallel with the liquid crystal display panel;
      a circuit substrate including a metallic substrate and arranged with the light guide element, a front surface of the circuit substrate facing a lateral side of the light guide element;
      light emitting diodes (LEDs) arranged on the front surface of the circuit substrate to emit light toward the lateral side of the light guide element;
      a first heat transmission member having a first portion arranged along the light guide element, an inner surface of the first portion of the first heat transmission member facing a bottom surface of the light guide element, and a second portion extending from an end of the first portion of the first heat transmission member to be arranged along the circuit substrate, an inner surface of the second portion of the first heat transmission member facing a rear surface of the metallic substrate of the circuit substrate;
      a second heat transmission member having a first portion arranged along the first portion of the first heat transmission member, an outer surface of the first portion of the second heat transmission member contacting the inner surface of the first portion of the first heat transmission member, and a second portion arranged along the second portion of the first heat transmission member, an outer surface of the second portion of the second heat transmission member contacting the inner surface of the second portion of the first heat transmission member;
      an intervening element disposed between the circuit substrate and the second portion of the second heat transmission member, an inner surface of the intervening element contacting the rear surface of the metallic substrate of the circuit substrate and an outer surface of the intervening element contacting an inner surface of the second portion of the second heat transmission member; and
      a reflection element disposed between the light guide element and the first portion of the second heat transmission member, an upper surface of the reflection element contacting the bottom surface of the light guide element and a bottom surface of the reflection element contacting an inner surface of the first portion of the second heat transmission member to reflect the light toward the liquid crystal display panel through the light guide element,
      wherein the LEDs are arranged to be spaced apart from the lateral side of the light guide element.

8. The backlight unit of claim 1, wherein the circuit substrate has a thin plate shape.

9. The backlight unit of claim 1, wherein the inner surface of the first portion of the second heat transmission member does not directly contact the bottom surface of the light guide element.

10. The backlight unit of claim 9, wherein the inner surface of the first portion of the first heat transmission member does not directly contact the bottom surface of the light guide element.

11. The backlight unit of claim 1, wherein the first portion of the second heat transmission member entirely extends across the bottom surface of the reflection element.

12. The backlight unit of claim 1, wherein the reflection element has a portion which extends toward the circuit substrate beyond the lateral side of the light guide element.

13. The backlight unit of claim 1, wherein the LEDs and the lateral side of the light guide element are spaced at a predetermined interval to mix the lights.

14. The backlight unit of claim 13, wherein the reflection element has:
- a first portion on which the upper surface of the reflection element contacting the bottom surface of the light guide element and the bottom surface of the reflection element contacting the inner surface of the first portion of the second heat transmission member are provided,
- a second portion extending from an end of the first portion of the reflection element to be arranged along the circuit substrate, wherein holes are provided on the second portion of the reflection element to accommodate the LEDs to be spaced from the lateral side of the light guide element, and
- a third portion extending from an end of the second portion of the reflection element toward the lateral side of the light guide element.

15. The display device of claim 7, wherein the second heat transmission member is in thermal contact with the LEDs and the circuit substrate to receive heat from the LEDs through the circuit substrate and transmit the received heat to the first heat transmission member.

16. The display device of claim 7, wherein the intervening element comprises a gap pad which has a thin plate shape.

17. The display device of claim 7, wherein the inner surface and the outer surface of the intervening element adhere the rear surface of the metallic substrate of the circuit substrate and the inner surface of the second portion of the second heat transmission member, respectively, and
wherein the intervening element is in thermal contact with the circuit substrate and the second heat transmission member.

18. The display device of claim 7, wherein a size of the upper surface of the reflection element is larger than a size of the bottom surface of the light guide element.

19. The display device of claim 7, wherein the first heat transmission member and the second heat transmission member are made of graphite and metal, respectively.

20. The display device of claim 7, wherein the circuit substrate has a thin plate shape.

21. The display device of claim 7, wherein the inner surface of the first portion of the second heat transmission member does not directly contact the bottom surface of the light guide element.

22. The display device of claim 21, wherein the inner surface of the first portion of the first heat transmission member does not directly contact the bottom surface of the light guide element.

23. The display device of claim 7, wherein the first portion of the second heat transmission member entirely extends across the bottom surface of the reflection element.

24. The display device of claim 7, wherein the reflection element has a portion which extends toward the circuit substrate beyond the lateral side of the light guide element.

25. The display device of claim 7, wherein the LEDs and the lateral side of the light guide element are spaced at a predetermined interval to mix the lights.

26. The display device of claim 25, wherein the reflection element has:
- a first portion on which the upper surface of the reflection element contacting the bottom surface of the light guide element and the bottom surface of the reflection element contacting the inner surface of the first portion of the second heat transmission member are provided,
- a second portion extending from an end of the first portion of the reflection element to be arranged along the circuit substrate, wherein holes are provided on the second portion of the reflection element to accommodate the LEDs to be spaced from the lateral side of the light guide element, and
- a third portion extending from an end of the second portion of the reflection element toward the lateral side of the light guide element.

27. A display device, comprising:
a liquid crystal display panel; and
a back light unit,
wherein the back light unit comprises:
- a light guide element arranged parallel with the liquid crystal display panel;
- a circuit substrate arranged with the light guide element, a front surface of the circuit substrate facing a lateral side of the light guide element;
- light emitting diodes (LEDs) arranged on the front surface of the circuit substrate to emit light toward the lateral side of the light guide element;
- a first heat transmission member having a first portion arranged along the light guide element, an inner surface of the first portion of the first heat transmission member facing a bottom surface of the light guide element, and a second portion extending from an end of the first portion of the first heat transmission member to be arranged along the circuit substrate, an inner surface of the second portion of the first heat transmission member facing a rear surface of the metallic substrate of the circuit substrate;
- a second heat transmission member having a first portion arranged along the first portion of the first heat transmission member, an outer surface of the first portion of the second heat transmission member contacting the inner surface of the first portion of the first heat transmission member, and a second portion arranged along the second portion of the first heat transmission member, an outer surface of the second portion of the second heat transmission member contacting the inner surface of the second portion of the first heat transmission member; and
- a reflection element disposed between the light guide element and the first portion of the second heat transmission member, an upper surface of the reflection element contacting the bottom surface of the light guide element and a bottom surface of the reflection element contacting an inner surface of the first portion of the second heat transmission member to reflect the light toward the liquid crystal display panel through the light guide element, and
wherein the LEDs are arranged to be spaced apart from the lateral side of the light guide element.

28. The display device of claim 27, wherein the second heat transmission member is in thermal contact with the LEDs and the circuit substrate to receive heat from the LEDs through the circuit substrate and transmit the received heat to the first heat transmission member.

29. The display device of claim 27, wherein a size of the upper surface of the reflection element is larger than a size of the bottom surface of the light guide element.

30. The display device of claim 27, wherein the circuit substrate includes a metallic substrate which has a thin plate shape.

31. The display device of claim 27, further comprising a gap pad which has a thin plate shape and is disposed in contact between the circuit substrate and the second portion of the second heat transmission member.

32. The display device of claim 27, wherein the inner surface of the first portion of the second heat transmission member and the inner surface of the first portion of the first heat transmission member do not directly contact the bottom surface of the light guide element.

33. The display device of claim 27, wherein the first portion of the second heat transmission member entirely extends across the bottom surface of the reflection element.

34. The display device of claim 27, wherein the LEDs and the lateral side of the light guide element are spaced at a predetermined interval to mix the lights.

35. The display device of claim 34, wherein the reflection element has:
  a first portion on which the upper surface of the reflection element contacting the bottom surface of the light guide element and the bottom surface of the reflection element contacting the inner surface of the first portion of the second heat transmission member are provided,
  a second portion extending from an end of the first portion of the reflection element to be arranged along the circuit substrate, wherein holes are provided on the second portion of the reflection element to accommodate the LEDs to be spaced from the lateral side of the light guide element, and
  a third portion extending from an end of the second portion of the reflection element toward the lateral side of the light guide element.

36. The backlight unit of claim 1, wherein an air gap is provided between the LEDs and the lateral side of the light guide element.

37. The display device of claim 7, wherein an air gap is provided between the LEDs and the lateral side of the light guide element.

38. The display device of claim 27, wherein an air gap is provided between the LEDs and the lateral side of the light guide element.

* * * * *

UNITED STATES PATENT AND TRADEMARK OFFICE
CERTIFICATE OF CORRECTION

PATENT NO. : 10,712,610 B2
APPLICATION NO. : 16/222273
DATED : July 14, 2020
INVENTOR(S) : Kim et al.

Page 1 of 1

It is certified that error appears in the above-identified patent and that said Letters Patent is hereby corrected as shown below:

In the Claims

Column 9, Line 56, In Claim 2, before "second" delete "first".

Signed and Sealed this
Eighth Day of September, 2020

Andrei Iancu
*Director of the United States Patent and Trademark Office*